US006804996B2

(12) United States Patent
Bezerko (10) Patent No.: US 6,804,996 B2
(45) Date of Patent: Oct. 19, 2004

(54) HEAD GASKET TESTING APPARATUS AND METHOD

(75) Inventor: Richard W. Bezerko, Farmington Hills, MI (US)

(73) Assignee: EDP Technical Services, Inc., Livonia, MI (US)

( * ) Notice: Subject to any disclaimer, the term of this patent is extended or adjusted under 35 U.S.C. 154(b) by 19 days.

(21) Appl. No.: 10/391,902

(22) Filed: Mar. 18, 2003

(65) Prior Publication Data

US 2004/0182141 A1 Sep. 23, 2004

(51) Int. Cl.[7] .............................................. G01M 15/00
(52) U.S. Cl. ..................................................... 73/118.1
(58) Field of Search ............................... 73/116, 117.2, 73/117.3, 118.1, 119 R; 340/438, 449

(56) References Cited

U.S. PATENT DOCUMENTS

| | | | |
|---|---|---|---|
| 2,502,480 A | | 4/1950 | Platon |
| 2,689,474 A | | 9/1954 | Wachtel |
| 3,142,171 A | | 7/1964 | Royen |
| 3,672,182 A | | 6/1972 | Stowasser et al. |
| 4,987,769 A | | 1/1991 | Peacock et al. |
| 5,048,597 A | * | 9/1991 | Bond ........................... 165/41 |
| 5,115,771 A | * | 5/1992 | Ozawa ..................... 123/41.72 |
| 5,324,114 A | * | 6/1994 | Vinci .......................... 374/208 |
| 5,375,453 A | | 12/1994 | Rudd et al. |
| 5,394,704 A | | 3/1995 | Johnson |
| 6,185,952 B1 | | 2/2001 | McCollin |
| 6,227,038 B1 | | 5/2001 | Blossfeld et al. |

* cited by examiner

*Primary Examiner*—Eric S. McCall
(74) *Attorney, Agent, or Firm*—Foley & Lardner LLP (57) ABSTRACT

A testing apparatus for testing a cylinder head gasket in an engine includes a positive displacement pump to optionally move engine coolant through a liquid or brine heat exchanger for lowering the temperature of the engine coolant below a predetermined temperature of about 110° F. to 120° F. The positive displacement pump then optionally flows the engine coolant at a flow rate of approximately 60 to 80 gallons per minute, through a liquid nitrogen heat exchanger which further lowers the temperature of the engine coolant to a temperature below approximately −16° F. to −40° F. The liquid nitrogen heat exchanger includes a liquid nitrogen distribution manifold located between first and second engine coolant heat exchangers and further includes an state for flowing additional liquid nitrogen there through to prevent boiling of the liquid nitrogen in the distribution manifold. The nitrogen distributed on the engine coolant heat exchangers boils and is then vented from the liquid nitrogen heat exchanger to cool the liquid heat exchanger.

36 Claims, 7 Drawing Sheets

HEAD GASKET TESTING APPARATUS AND METHOD

FIELD OF THE INVENTION

The present invention relates to the field of the cyclic, torture testing of an engine cylinder head gasket. More particularly, the present invention relates to an apparatus and a method for rapidly cooling the engine, including the cylinder head and cylinders using the engine's liquid cooling system, from a high temperature of approximately about 230° F. to 250° F. to a temperature of approximately about −16° F. to −40° F., thereby stressing the head gasket to between its extreme sealing limits.

BACKGROUND OF THE INVENTION

Engine cylinder head gasket designs must be tested under extreme conditions to predict whether a particular design will be able to withstand a lifetime of rigors associated with the conditions to which it will be exposed in an engine during regular use. Tests are known for conducting torture tests of cylinder head gaskets for liquid cooled engines. In one type of test, the engine coolant in the engine is cycled between hot and cold under specific conditions for periods of time to cause the engine to expand and contract in a predetermined manner.

In this type of testing apparatus and method, the integrity of the engine's head gasket and design are tested by cyclically exposing the engine to extreme coolant temperatures by running the engine hard to make it become very hot and then by running super chilled coolant in the engine's cooling system, both for prolonged periods of time, thereby causing maximum expansion and contraction of the cylinder head, engine block, cylinder bolts, etc. and subsequent compression and relaxation of the head gasket. More specifically, the cylinder heads and cylinders are exposed to relatively high coolant temperatures of approximately about 230° F. to 240° F. and then relatively very cold or super chilled engine coolant is run into the testing system and engine so the engine is rapidly exposed to the very cold temperatures of about −40° F. to −16° F.

In fact, there is a known specification setting the parameters under which one OEM conducts such head gasket tests for engines. Ford Motor Company test specification CETP: 03.01-L315, details the timing, testing points, temperatures and methods for its preferred methodology in conducting head gasket torture testing, which is incorporated herein by reference. However, it is understood in practice that it is very difficult to develop a test apparatus which is capable of meeting every detail of this specification.

In one common test conducted pursuant to the Ford specification, the engine is exposed to the relatively hot engine coolant during a first test period and is then subsequently exposed to the relatively cold coolant in a second test period. During the first period, lasting on order about 15 minutes, the engine is started and stabilized at idle for 1 minute and as the first period continues the engine is then run at wide open throttle (W.O.T.) while yielding maximum horse power, and maximum internal cylinder pressures to stress the head gasket, for 14 minutes. During this first period the coolant out temperature commonly stabilizes between 230° F. to 240° F. and the coolant system pressure is on the order of approximately between 13 and 16 psig (90 to 110 kPa).

At the end of the first period, the engine is stopped (i.e., zero RPM) during the second test period for approximately 15 minutes. During the second test period, the relatively hot coolant is continuously replaced with super chilled coolant to maintain the coolant out temperature from the engine between approximately about −16° F. to −40° F. as quickly as possible, preferably within ten minutes of engine stoppage and remain at that level until fifteen minutes has passed since the engine stopped. The completion of the first and second test periods, completes one thirty minute test cycle. The test cycle is then continuously repeated until the engine cylinder gasket experiences a predetermined number of testing cycles (typically at least 50 or more testing cycles depending on the type of engine and customer requirements) or until the head gasket fails.

Figure 1:
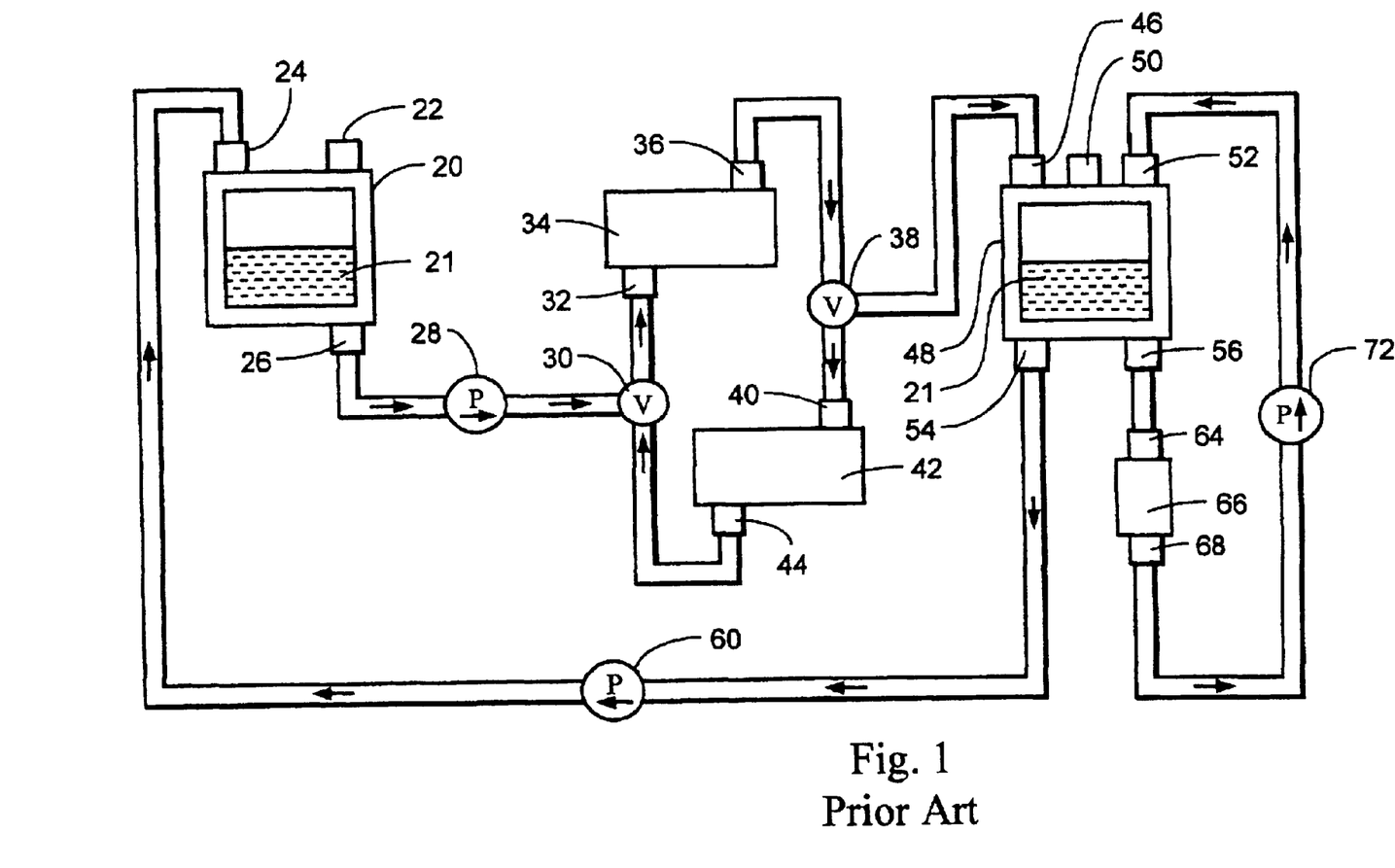
FIG. 1 is a schematic diagram of the conventional system used to cool engine coolant, the coolant being used in the cyclic testing of engine cylinder head gaskets.

A conventional testing apparatus design for conducting a head gasket test for cooling the engine coolant to perform the second period of the testing cycle is shown in FIG. 1. Depending upon the engine size and type, a typical chill cycle (or second test period) requires 5 to 25 gallons per minute of super chilled coolant to reach the desired engine out cold temperature of approximately −16° F. to −40° F. Thus, for a 15 minute second test period, there will be required approximately between 75 and 375 gallons of super chilled engine coolant to complete one testing cycle. Since it is common for one cooling system to be designed to support several simultaneously running engine head gasket tests, the amount of required super chilled engine coolant may be doubled, tripled or even more. Thus, existing test facilities are known to begin with a 2000–3000 gallon insulated cold storage tank 20 containing a coolant 21 typically maintained between approximately −20° F. and −40° F.

It should be noted that the engine coolant can be any conventional or appropriate coolant or other liquid (or a combination thereof) that has a freezing point less than approximately −50° F. Usually, it is common to use a 40/60 mixture of water and conventional coolant, such as an ethylene-glycol based coolant.

The tank 20 has an inlet 24, an outlet 26, and a vent 22. Super chilled coolant 21 exits the cold storage tank 20, via the outlet 26, and is pumped by a first vane or rotary pump 28 to a first valve 30. The coolant 21 entering the first valve 30 flows, via an inlet 32, into the cooling system of the engine 34 around the cylinder and cylinder head cooling cavities. While in the engine 34, the coolant 21 absorbs heat from the engine 34 thereby reducing the temperature of the engine 34 and its components. After passing through the engine 34, the coolant 21 exits, via an outlet 36, and flows to a second valve 38. At this juncture, the coolant 21 may be channeled into a air-cooled radiator 42 (via a radiator inlet 40) or be channeled into a recovery tank 48. It should be appreciated that the tank 48 must necessarily be of equal or greater size than storage tank 20.

Referring still to FIG. 1, if the coolant 21 is directed to the radiator 42, the coolant passes there through and exits the radiator 42 via an outlet 44. The coolant 21 then flows back to the first valve 30 which, in turn, directs the coolant 21 back to the engine 34. This is the typical valve selection and coolant flow for the hot cycle or the first test period wherein the coolant in the engine runs at a temperature of approximately about 230° F. to 240° F. On the other hand, if the coolant 21 exiting the engine 34 at the outlet 36 is pumped into an inlet 46 of the recovery tank 48, two possible results exist for the coolant 21.

The first result is that the heated engine coolant 21 may be channeled, via an outlet 36 in the recovery tank 48, into a refrigeration or super chilling unit 66 via an inlet 64 in the refrigeration unit 66. The refrigeration unit 66 is typically a relatively very large capacity system in the 30–100 ton range (wherein the system is capable of removing heat from the engine coolant at a rate of 360,000 to 1,200,000 BTU/Hr or 6,000 to 20,000 BTU/Min). The refrigeration unit 66 must be sufficiently large enough to rapidly cool the engine coolant 21 in the recovery tank 48 to the desired testing temperature while minimizing down time between cycles. The refrigeration unit 66 employs conventional mechanical cooling techniques such as using a hydrofluorocarbon refrigerant, or the like, to create a sufficient cooling capacity to super chill the engine coolant 21 to approximately −20° F. to −40°F. ("testing temperature") for use in conducting the head gasket test. Despite the significantly large cooling capability of the refrigeration unit 66, it is common to have the engine coolant 21 be circulated multiple times through the refrigeration unit 66 until the engine coolant 21 reaches the desired testing temperature. Once the desired testing temperature is reached, the re-cooled (and now super chilled) engine coolant 21 enters the recovery tank via a second inlet 52.

By circulating the re-cooled engine coolant 21 through the refrigeration unit 66 and outlet 68 back into the recovery tank 48, the overall temperature of the engine coolant 21 in the recovery tank 48 along with the pressure therein will be lowered. The recovery tank 48 is alternatively provided with a vent 50 to regulate pressure in the tank 48.

In the second result, the engine coolant 21 in the recovery tank 48 is not re-circulated through the refrigeration unit 66. Instead, the engine coolant 21 exits the recovery tank 48 via an outlet 54 and is pumped directly, by a third pump 60, back to the cold storage tank 20. This is typically done only if the coolant 21 is still at a sufficiently cold temperature within the testing temperature range for purposes of running the head gasket test.

It should also be appreciated that most, if not all, of the valves and controls of the present design are controlled by an electronic control system (not shown). It is known that the control system uses many known devices such as a Central Processing Unit (CPU) and other processing equipment to control the testing equipment and to operate the testing methodology. The control system (not shown), is employed to control the opening and closing of the first and second valves 30, 38 and to control the first, second, and third pumps 28, 72, 60. This known cooling system, as used for torture testing head gaskets, has experienced a number of problems which will be explained in detail.

To achieve the rapid cooling necessary to run the head gasket test within the limits of the noted specification, each test cycle conventionally uses approximately 75 to 375 gallons of engine coolant per test cycle, depending on engine size and type. Further, to be able to conduct multiple, continuous test cycles every 30 minutes, most installations must store roughly 2000 gallons or more of super chilled engine coolant thereby taking up a large amount of space and further adding to costs of an already expensive system. Further, the capital costs of assembling and installing the conventional system including the costs relating to the insulated cold storage tank 20, refrigeration system 66, and recovery tank 48 and the related network of tubes, conduits, pipes, controls, etc. are very significant. Accordingly, the cost to chill and store such relatively large volumes of engine coolant is great and makes running the head gasket test very expensive. However great the cost of the head gasket testing equipment, OEMs are forced to incur such costs because the warranty costs (several thousand dollars per vehicle) of having to repair faulty head gaskets are even far greater.

Second, the system is physically large and thereby occupies a large amount of floor space. In addition, the system employs a correspondingly large electrical infrastructure and the electrical energy costs are great with the above mentioned system since, it practice, it requires approximately 110 to 350 Kilowatts per hour to operate. This is primarily due to the fact that the large storage tank 20 has heat loss and requires constant refrigeration to keep the engine coolant 21 cold even when a test is not being conducted. Further, as a result of the overall size and complexity of the low temperature refrigeration system of the known art, frequent maintenance is required.

An alternative design has been proposed wherein engine coolant in the testing system is exposed to the direct injection of liquid nitrogen to reduce the temperature of engine coolant. However, this design has also been found to be problematic for a number of reasons and, in fact, can not be run in practice. As the liquid nitrogen is released directly into the engine coolant, the liquid nitrogen expands due to the warming effect of the engine coolant on the liquid nitrogen. The warming of the liquid nitrogen results in the release of massive amounts of gas since each gallon of liquid nitrogen used results in approximately 100 $ft^3$ of gas produced. As a result, the system must be extensively ventilated to prevent a rapid pressure increase which could otherwise cause a system rupture. In addition, rapidly lowering the temperature of the engine coolant by direct exposure with liquid nitrogen causes significant freezing problems and has proven to be quite difficult to control on a continuous basis. In particular, the coolant often freezes at the injection point of the liquid nitrogen because the temperature of the liquid nitrogen is far below the freezing point of the engine coolant.

Additional attempts have been made to make direct expansion of liquid nitrogen with the coolant feasible. Such attempts include the use of high flow rate centrifugal pumps to rapidly pump the coolant through the system and avoid freezing of the coolant. However, these pumps have failed to solve the problem of engine coolant freezing, i.e., the engine coolant still frequently freezes in response to the direct application of liquid nitrogen due the difficulty in controlling such a process.

To avoid the rapid freezing caused by liquid nitrogen, some have tried using a highly pressurized brine. However, the highly pressured brine has also been found to be unsuccessful because the brine itself often freezes before it is able to sufficiently lower the temperature of the engine coolant.

In view of the above noted drawbacks with the existing systems, there remains a significant need to improve the known systems or to develop a system without the noted drawbacks. A new system is needed which can provide sufficient cooling effect to supply a sufficient amount of super chilled coolant to continuously run multiple and/or simultaneous head gasket torture tests while not experiencing the aforementioned problems and limitations of the known systems.

SUMMARY OF THE INVENTION

One embodiment of the present invention relates to a system and method of removing heat from engine coolant for use in conducting a torture test of a head gasket in an engine. Further, the present invention relates to a testing apparatus for use in rapidly and cyclically cooling the engine coolant that is circulated through the engine and thereby stressing the head gasket of the engine. In one embodiment of the present invention, the testing apparatus, for cooling the engine coolant circulated through the engine containing the head gasket to be tested, includes a heat exchanger utilizing liquid nitrogen for rapidly removing heat from the engine coolant, and a positive displacement pump in fluid communication with an outlet of the engine for pumping the engine coolant.

In one embodiment of the present invention, the testing apparatus, for cooling the engine coolant circulated through the engine containing the head gasket to be tested, includes a heat exchanger utilizing liquid nitrogen for rapidly removing heat from the engine coolant, a pump that is in fluid communication with an outlet of the engine for pumping the engine coolant, a valve in fluid communication with an outlet of the pump, and a liquid heat exchanger, for pre-cooling the engine coolant, having an inlet and an outlet. The liquid heat exchanger outlet is in fluid communication with the liquid nitrogen heat exchanger such that engine coolant passing through the liquid heat exchanger passes there through or may optionally be communicated directly to the engine. The valve is adapted to direct engine coolant flowing from the pump in a first direction if the temperature of the coolant is above a predetermined value and in a second direction if the temperature of the coolant is not above the predetermined value.

In one embodiment, the pump for circulating the engine coolant is a positive displacement pump which forces the engine coolant to flow at a relatively very high rate of approximately about sixty to approximately about eighty gallons per minute, relatively independent of the viscosity of the engine coolant. In one embodiment of the present invention, the testing apparatus includes a temperature measuring device adapted to measure the temperature of engine coolant passing through the positive displacement pump. In one embodiment, the testing apparatus of the present invention preferably includes less than about ten gallons of engine coolant adapted to flow through the cooling circuit of the engine and through the liquid heat exchanger and through the liquid nitrogen heat exchanger and back to the engine's cooling circuit. The use of the liquid water heat exchanger provides for the pre-cooling of the engine coolant. In this regard, the use of a pre-cooler is more economical since the entire system uses less liquid nitrogen to cool the heated coolant generated during the hot cycle of the test. The liquid heat exchanger preferably removes sufficient heat from the engine coolant to change the temperature of the engine coolant leaving the engine from approximately 230° F. to 240° F. to approximately 110° F. to 120° F. The liquid heat exchanger preferably uses an approximately 60° F. brine solution that is cooled as a result of the exhaust by-product of the liquid nitrogen heat exchanger (i.e., cold nitrogen gas). In one embodiment, the predetermined switchover point from using only the liquid heat exchanger to using both the liquid heat exchanger and the liquid nitrogen heat exchanger is preferably when the temperature of the engine coolant is in a range of approximately about 110°F. to about 120° F. or more but may alternatively be selected at a point outside of the noted range.

In one embodiment, the head gasket testing apparatus includes a liquid nitrogen supply tank. In an alternative embodiment, the liquid nitrogen supply tank is located outside of a building and an intake line is provided in fluid communication between the liquid nitrogen supply tank and the liquid nitrogen heat exchanger.

In one embodiment of the present invention, the testing apparatus includes a liquid nitrogen heat exchanger including liquid nitrogen distribution manifold and at least one engine coolant heat exchanger adapted to have liquid nitrogen from the liquid nitrogen distribution manifold sprayed there upon. In one alternate embodiment, the liquid nitrogen heat exchanger includes a second engine coolant heat exchanger positioned with respect to the liquid nitrogen distribution manifold and adapted to have liquid nitrogen sprayed there upon to cool engine coolant passing through the engine coolant heat exchanger.

In one embodiment, the head gasket testing apparatus further includes a bypass loop adapted to circulate liquid nitrogen in the liquid nitrogen distribution manifold of the liquid nitrogen heat exchanger, to help in maintaining the liquid nitrogen within the liquid nitrogen distribution manifold at cryogenic temperatures to prevent liquid nitrogen vaporization (boiling) in the liquid nitrogen distribution manifold.

One embodiment of the present invention relates to a method of operating a testing apparatus for conducting a test of a head gasket in an engine. The method for operating the head gasket test apparatus includes the steps of running a first test period wherein the engine is running for a specified period of time under specified conditions and the temperature of engine coolant exiting the engine thereby rises to a certain engine out temperature range; stopping the engine for a period of time; pumping the heated engine coolant out of the engine; and measuring the temperature of the engine coolant exiting the engine to determine whether it is above a predetermined temperature. Further steps include, if the temperature of the engine coolant exiting the engine is above the predetermined temperature: then routing the engine coolant into a liquid heat exchanger to lower the temperature of the engine coolant; recycling the engine coolant back into the engine; and returning to the step of measuring the temperature of the engine coolant exiting the engine. In addition, the method of operating the head gasket test includes the step of: if the measured temperature of the engine coolant exiting the engine is below the predetermined temperature, directing the engine coolant into a liquid nitrogen heat exchanger to lower the temperature of the engine coolant to a temperature in the range of approximately −16° F. to −40° F.; recycling the engine coolant 21 back into the engine; and pumping the engine coolant out of the engine using the pump. In the one embodiment of the present invention, the method of operating the head gasket testing apparatus is repeated for one or more additional cycles or until the head gasket fails.

In one alternate embodiment, the invention includes a method of reducing the temperature of an engine coolant used in an automobile engine. The method of reducing the temperature of the coolant includes the steps of: pumping the engine coolant using a pump; and measuring the temperature of the engine coolant to determine whether its temperature at the point exiting the engine is above a predetermined temperature. If the temperature of the engine coolant is above the predetermined temperature, the method includes the step of using a positive displacement pump to pump the engine coolant through a liquid heat exchanger; using the positive displacement pump to pump the engine coolant through a liquid nitrogen heat exchanger; recycling the coolant back into the engine; and then repeating the process.

The method also includes the step of supplying liquid nitrogen to the liquid nitrogen heat exchanger from a supply tank. In one alternate embodiment, the method further includes the step of supplying liquid nitrogen to a bypass loop in the liquid nitrogen heat exchanger to ensure the liquid nitrogen in the liquid nitrogen heat exchanger does not boil. The method alternatively includes the step of venting gaseous nitrogen from the liquid nitrogen heat exchanger to an air-cooled radiator to work in lowering the brine temperature which was subsequently heated during the pre-cooling cycle in the liquid heat exchanger. In one embodiment, the method includes the step of maintaining the temperature of the engine coolant-at a second predetermined temperature of approximately about −40° F. to approximately −16°F.

These and other features, aspects, and advantages of the present invention will become more apparent from the following description, appended claims, and accompanying exemplary embodiments shown in the drawings.

BRIEF DESCRIPTION OF THE DRAWINGS

The accompanying drawings, which are incorporated in and constitute a part of the specification, illustrate a preferred embodiment of the invention and together with the description, serve to explain the principles of the invention but are not intended to be limiting thereon.

DETAILED DESCRIPTION OF THE PREFERRED EMBODIMENTS

Reference will now be made in detail to a presently preferred embodiment of the invention as illustrated in the drawings. An effort has been made to use the same reference numbers throughout the drawings to refer to the same or like parts.

Figure 2:
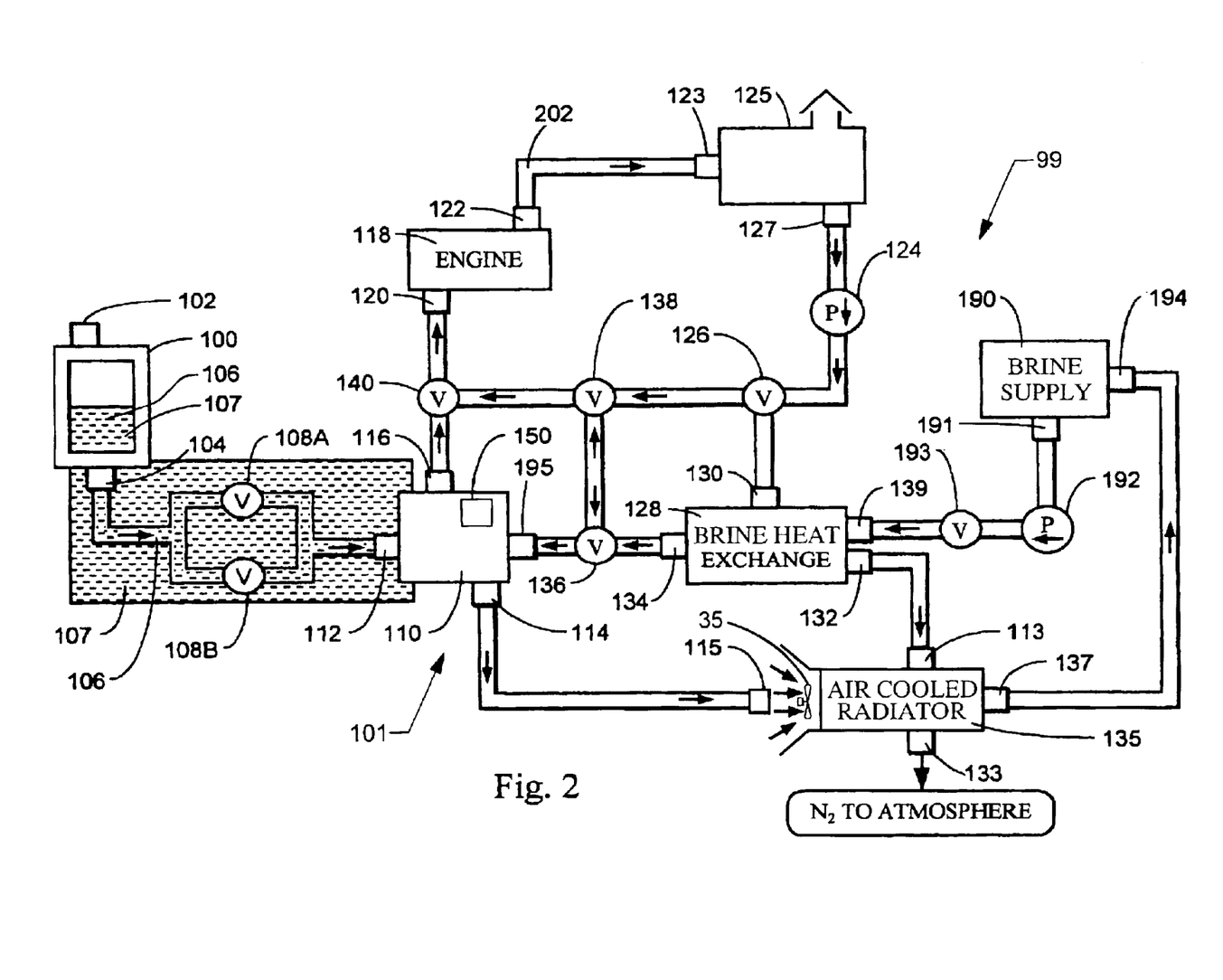
FIG. 2 is a schematic diagram of a testing apparatus according to the present invention used to cool engine coolant to be used in the cyclic testing of a head gasket on an engine.
Figure 3:
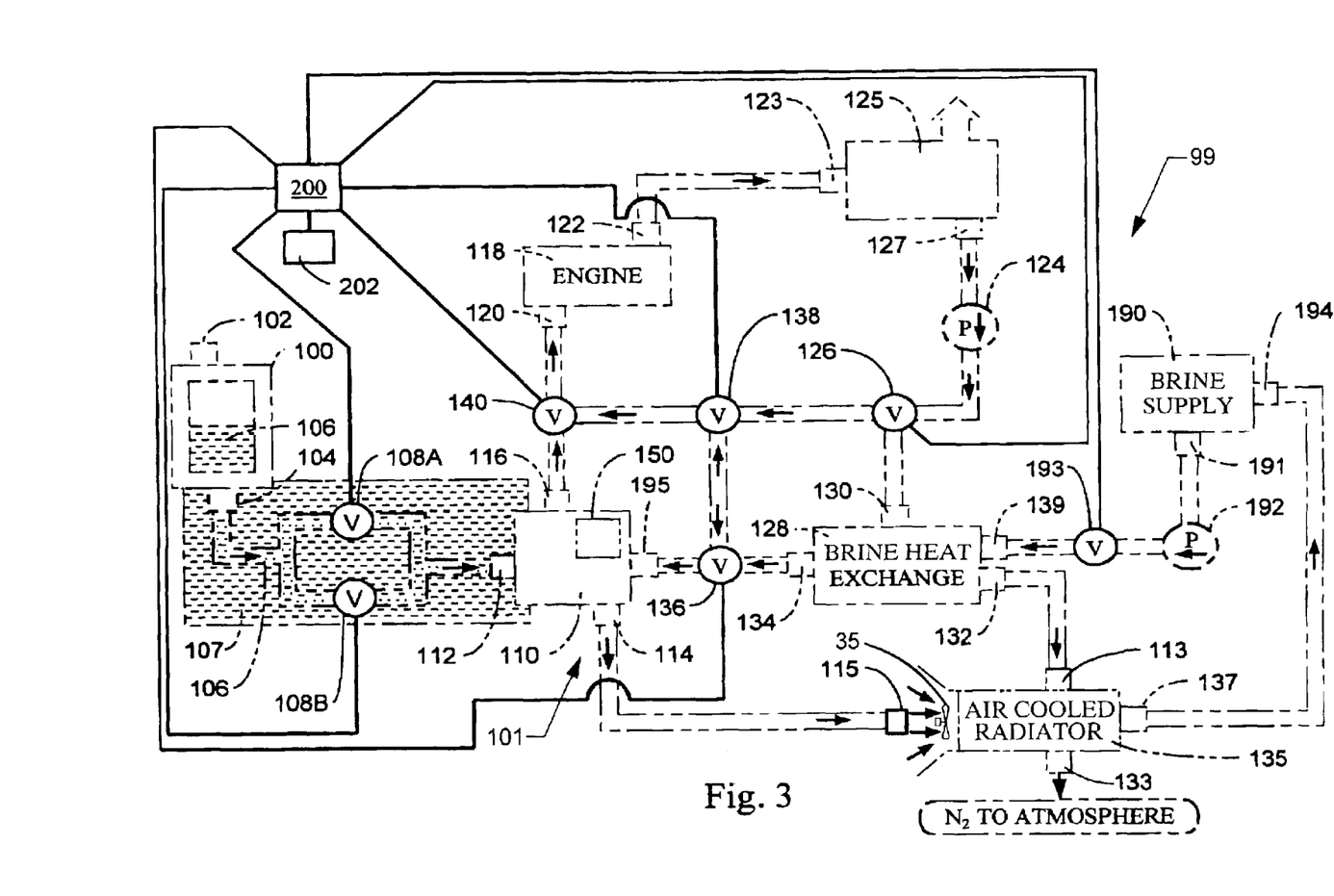
FIG. 3 is a schematic diagram of a controller linked to the testing apparatus according to the present invention including a temperature measuring device.

Referring generally to FIGS. 2 through 8, and in particular to FIGS. 2 and 3 there is shown a testing system and apparatus 99 is used for conducting a head gasket torture test procedure in accordance with known specifications for the testing temperature and time requirements. The testing apparatus 99 includes a cooling system 101 used to more rapidly cool engine coolant 21 during the head gasket torture test. The cooling system 101 is capable of providing engine coolant having a temperature between approximately −40° F. to −16° F. within ten minutes of engine stoppage. Further, the cooling system 101 will maintain the temperature of the engine coolant 21 for the time required in the testing specification (i.e., until fifteen minutes have passed since engine stoppage).

The testing apparatus 99 includes a cooling system 101 in which engine coolant 21 is cycled through an engine 118. The testing apparatus 99 is designed to test a cylinder head gasket (not shown) of the engine 118 using industry standard testing specifications or any other test specification using a cyclical, alternating hot and cold test procedure as described above. The engine coolant 21 may be any conventional coolant, liquid, or combination thereof, providing it has a freezing point of less than approximately −50°F., and it is preferable that the engine coolant 21 be a mixture of sixty percent (60%) ethylene glycol and forty percent (40%) water. With reference to the cooling system 101, a first valve 140 is chosen to begin the description of the components and system operation.

Engine coolant 21 passing through the first valve 140 enters the traditional cooling system of an engine 118 via an inlet 120. While in the engine 118, the engine coolant 21 lowers the temperature of the engine 118 and the related cylinder head and cylinders, causing the head bolts to contract and compress the cylinder head gasket therein. The engine coolant 21 then leaves the engine 118 via an outlet 122 and enters a storage tank 125 via inlet 123. The engine coolant 21 is pumped out of the storage tank 125 (via outlet 127) by a positive displacement pump 124 to a second valve 126. An example of a positive displacement pump 124 appropriate for this cooling system 101 is the Gorman-Rupp GHS2JL3-B model pump available from Detroit Pump & Manufacturing Company, Detroit, Mich. having a displacement rating of 77 gallons per minute at a pressure of up to 200 psi.

The positive displacement pump 124 pumps the engine coolant 21 though the cooling system 101 at a preferably constant rate $R_1$, wherein is $R_1$ has a value of at least approximately 60 to 80 gallons per minute. Most preferably, the engine coolant 21 is pumped at a constant rate of about 77 gallons per minute. It should be appreciated that as the temperature of the engine coolant 21 is lowered, the viscosity of the engine coolant 21 is correspondingly increased. As a result, as the viscosity of the engine coolant 21 increases, the positive displacement pump 124 preferably must pump with increasing force to maintain the constant flow rate $R_1$. As the cooling system 101 only uses less than ten total gallons of engine coolant 21, during each minute, the entire volume of engine coolant 21 passes through the cooling system 101 multiple times (the number of times being equal to the flow rate ($R_1$) divided by the coolant volume (i.e., for a flow rate $R_1$-77 and 10 total gallons of engine coolant 21, the entire volume will cycle 7.7 times per minute).

Upon entering the second valve 126, the engine coolant 21 is directed in one of two directions depending on the temperature of the engine coolant 21. If the temperature of the engine coolant 21 passing through the pump 124 (as measured by a temperature measuring device 202, shown in FIG. 3) is above a predetermined temperature $T_{L1}$, wherein $T_{L1}$ is preferably somewhere in the range of about 110° F. to 120° F., the engine coolant 21 will be directed to an inlet 130 of a liquid heat exchanger 128 to be pre-cooled. During the first testing period the engine 118 is run at W.O.T. for a given period of time causing the engine coolant 21 in the engine 118 to become relatively hot. Initially, at the end of the first test period the engine 118 is shut off and the second test period begins. At this point, the temperature of the engine coolant 21 exiting the engine 118 will be about 230° F. to 240° F. Accordingly, until the temperature of the engine coolant 21 leaving the engine 118 is at or below the predetermined temperature $T_{L1}$, the engine coolant 21 will be directed to the water heat exchanger 128 which will pre-cool the engine coolant 21 until its temperature falls to below $T_{L1}$.

When the engine coolant 21 is directed into the liquid heat exchanger 128, a sixth valve 193 is switched to a position in which a brine solution (having a temperature of about 60° F.) stored in a tank 190 is pumped, by a centrifugal pump 192, through the liquid heat exchanger 128 at a rate of about ten gallons per minute. The brine solution leaving the tank 190 via an outlet 191, passes through the sixth valve 193 and enters the water heat exchanger 128 via an inlet 139. When passing through the liquid heat exchanger 128, relatively hot engine coolant 21 will cause the temperature of the brine solution to increase in the liquid heat exchanger 128 as heat is transferred from the relatively hot engine coolant 21 to the relatively cold brine solution thereby lowering the temperature of the engine coolant 21. The liquid heat exchanger 128 has any known or appropriate design for functioning as a heat exchanger which allows the engine coolant 21 and the brine solution to easily pass there through and efficiently transfer heat there between without allowing the engine coolant and the brine solution to mix.

The heated brine leaves the liquid heat exchanger 128 via an outlet 132 and enters a separate air cooled radiator 135 via an inlet 113. In the air cooled radiator 135, the heated brine from the liquid heat exchanger 128 is cooled by relatively cold nitrogen gas (generated by the liquid nitrogen heat exchanger 110) and ambient air is forced by a high velocity fan 35 through the air cooled radiator 135. The pre-cooling step will preferably take about three minutes given the noted parameters. If the temperature of the engine coolant 21 leaving the water heat exchanger 128 is below $T_{L1}$, the engine coolant 21 exiting the liquid heat exchanger 128 via outlet 134, is directed by a third valve 136 to the liquid nitrogen heat exchanger 110 (via a fourth valve 138) and the pre-cooling step ends. If the temperature of the engine coolant 21 is above $T_{L1}$, the engine coolant 21 is directed to the fourth valve 138 to be directed back to the first valve 140 so the engine coolant 21 can be cycled again through the engine 118 and the liquid heat exchanger 128 and the pre-cooling step continues.

When the pre-cooling step ends, the engine coolant 21 is cooled in the liquid nitrogen heat exchanger 110 by having heat drawn from the engine coolant 21 due to the relatively much colder liquid nitrogen 106 passing through one portion of the liquid nitrogen heat exchanger 110 as the engine coolant 21 passes through a portion of the liquid nitrogen heat exchanger 110. The engine coolant 21 is supplied to the liquid nitrogen heat exchanger from valve 136 via an inlet 195 and exits the liquid nitrogen heat exchanger 110 via outlet 116 where it is directed to the first valve 140 and is again sent to the engine 118. Preferably within about seven minutes of continuous circulation after initially directing the engine coolant 21 through the liquid nitrogen heat exchanger 110, the cooling system 101 will lower the temperature of the engine coolant 21 to a temperature below approximately about –16° F. Accordingly, the temperature of the engine coolant 21 will be in the range of approximately about –16° F. to –40° F. within ten minutes of stoppage of the engine 118 which is within certain industry testing specifications.

The cooling system 101 includes, in addition to the liquid nitrogen heat exchanger 110, an insulated and pressurized storage tank 100 which supplies liquid nitrogen 106 to the liquid nitrogen heat exchanger 110. The insulated and pressurized liquid nitrogen storage tank 100 is preferably located outside of a facility in which the engine head gasket test occurs. It should be understood that when liquid nitrogen, which is approximately –320° F. in its liquid state, begins to boil (i.e., turn from liquid to gas or "vaporize") when it is heated above its boiling point temperature. When liquid nitrogen boils, it produces approximately one hundred cubic feet. (100 ft$^3$) of nitrogen gas for each gallon of liquid nitrogen vaporized. This is an extremely large expansion coefficient and subsequently results in the potential to rapidly build-up pressure in any system where liquid nitrogen is being stored in a sealed system and heated.

The storage tank 100, which contains the cryogenically cooled liquid nitrogen 106, is provided with a pressure relief valve 102 (to vent vaporized nitrogen to atmosphere) and an outlet 104. Liquid nitrogen 106 is directed out of the tank 100, via the outlet 104, and passes through a fifth valve, which is alternatively a high-flow valve 108A or a low-flow valve 108B, and enters the liquid nitrogen heat exchanger 110 via an inlet 112. As engine coolant 21 passes through the liquid nitrogen heat exchanger 110, the liquid nitrogen 106 is warmed by the relatively hot engine coolant 21 passing through one side of the liquid nitrogen heat exchanger and is converted into its nitrogen gaseous form while the temperature of the engine coolant 21 is lowered (i.e., there is a heat exchange from the engine coolant 21 to the liquid nitrogen). The cold gaseous nitrogen is then directed to the air cooled radiator heat exchanger 135 via an outlet 114 in the liquid nitrogen heat exchanger 110 and inlet 115 in the air cooled radiator 135.

During the second part of the head gasket test cycle, approximately twelve minutes during which the liquid nitrogen heat exchanger 110 is engaged, the gaseous nitrogen passed to the air cooled radiator 135 cools the brine solution passing through the air cooled radiator 135. The relatively cold temperature of the gaseous nitrogen mixed with ambient air and accelerated through the air cooled radiator 135 by a high velocity fan 35 reduces the temperature of the brine to about 60° F. Subsequently, the cooled brine is directed via an outlet 137 in the air cooled radiator 135 to the storage tank 190, via an inlet 194, for use in the pre-cooling step of a subsequent head gasket testing cycle. In addition, the gaseous nitrogen and mixed air are then vented to the atmosphere via an outlet 133 in the air cooled radiator 135.

As the engine coolant 21 passes through the liquid nitrogen exchanger 110 at the constant rate $R_1$, as determined by the positive displacement pump 104, the engine coolant 21 is only in the liquid nitrogen heat exchanger 110 for a period of several seconds per cycle. Due to the relatively brief exposure to the cryogenic temperatures in the liquid nitrogen heat exchanger 110, the engine coolant 21 is only cooled a few degrees and therefore will not freeze.

To prevent an overcooling or freezing of the engine coolant 21, a controller 200 limits the flow of liquid nitrogen into the liquid nitrogen heat exchanger 110. Initially, when the liquid nitrogen heat exchanger 110 is engaged, liquid nitrogen flows through the high-flow valve 108A at a rate of about six to eight gallons per minute. However, when the temperature of the engine coolant 21 has been lowered below a predetermined limit $T_{L2}$ (preferably chosen to be below –16° F.), the liquid nitrogen is switched to be directed through the low-flow valve 108B which is opened and the high-flow valve 108A is closed. Liquid nitrogen flows through the low-flow valve 108B at a much lower rate ($R_2$) than the high-flow valve 108A. Preferably the lower flow rate $R_2$ is set to be approximately one to two gallons per minute. At this lower rate $R_2$ of flow, the liquid nitrogen supplied to the liquid nitrogen heat exchanger 110 maintains the temperature of the coolant at −20° F. to −40° F. It should be readily appreciated that the high-flow valve 108A and the low-flow valve 108B may be combined, i.e., it is equally possible to use one valve that has an adjustable flow rate. Further, the controller 200 is programmed to automate the flow of the liquid nitrogen 106 to avoid overcooling and freezing of the engine coolant 21 and to ensure that the liquid nitrogen does not vaporize or boil.

Figure 6:
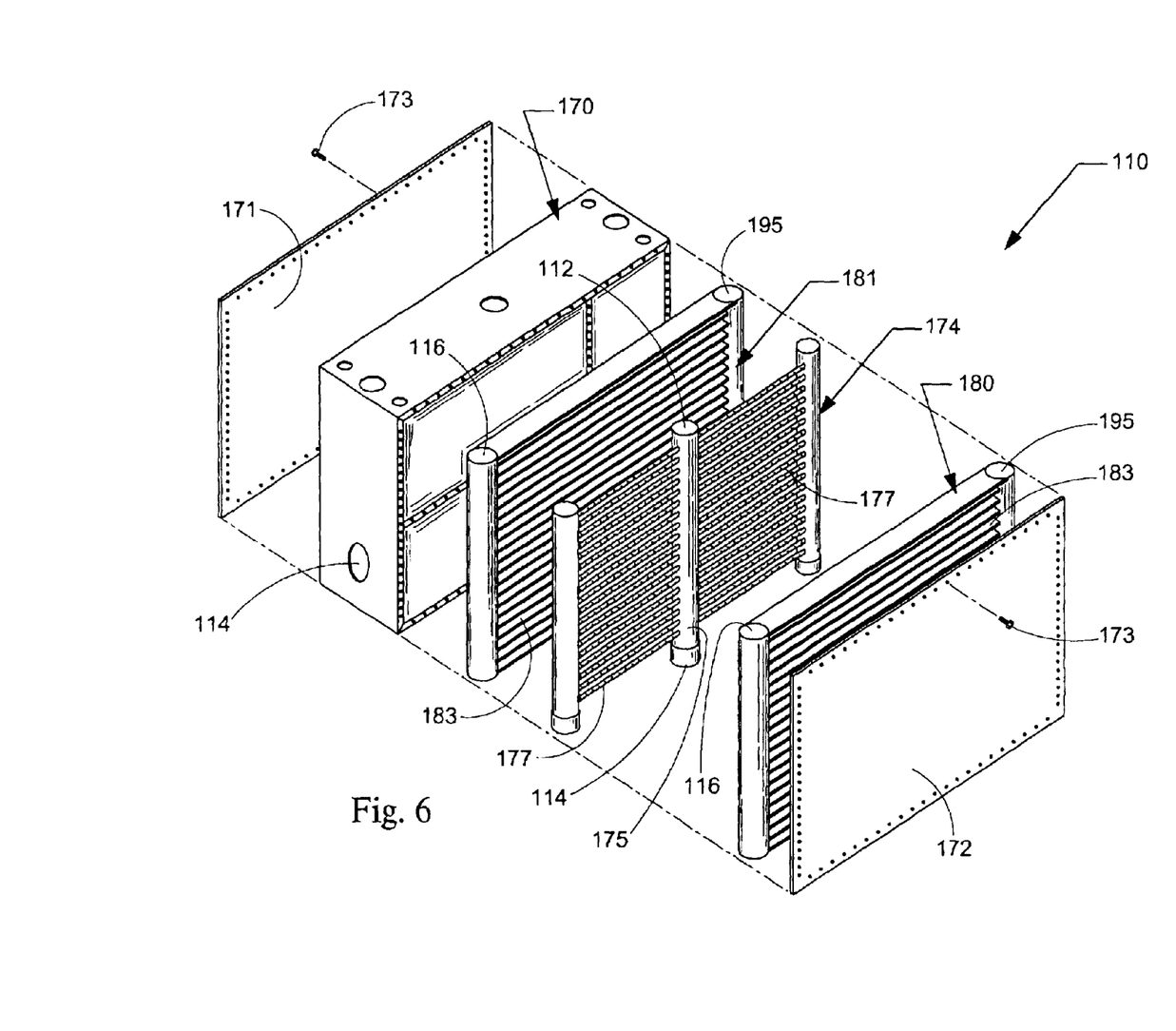
FIG. 6 is an exploded perspective view of a liquid nitrogen heat exchanger of a testing apparatus according to the present invention.
Figure 7:
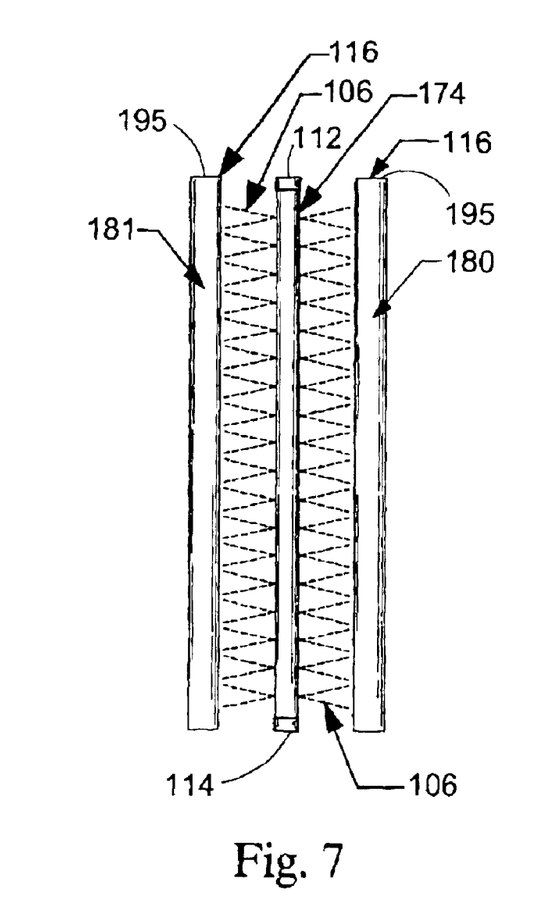
FIG. 7 is a plan, end view of the components of the liquid nitrogen heat exchanger of the testing apparatus of the present invention.
Figure 8:
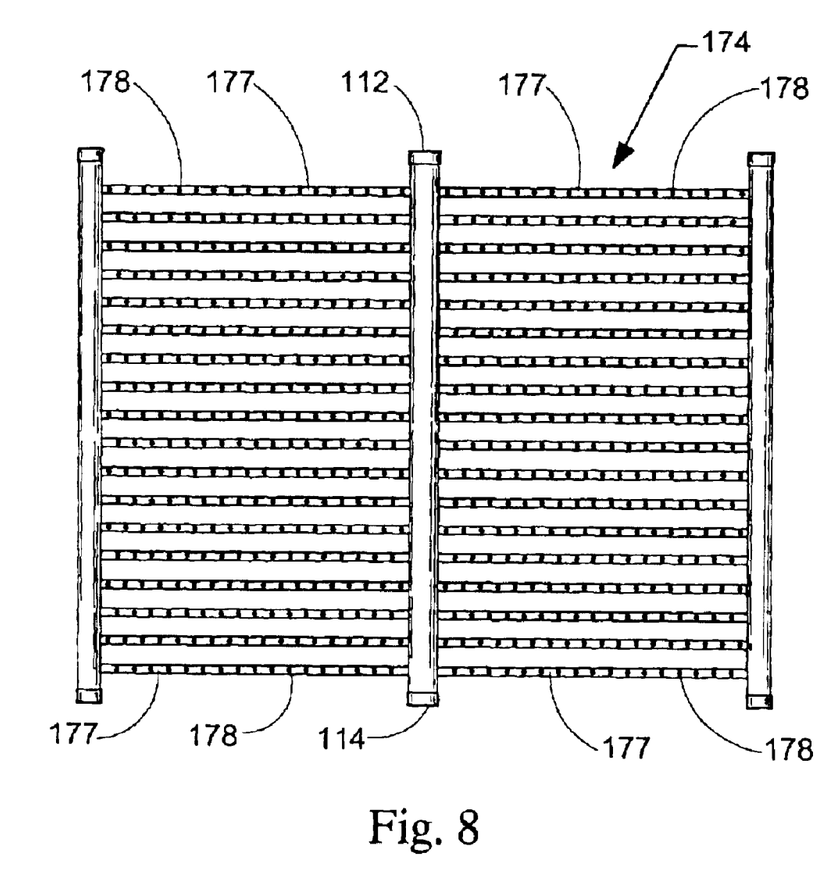
FIG. 8 is a side view of a liquid nitrogen distribution manifold used in the testing apparatus according to the present invention.

Referring now to FIGS. 6 through 8 there is shown in more detail the liquid nitrogen heat exchanger 110. It should be understood that the use of the terminology "liquid nitrogen heat exchanger" is for convenience and is intended to simply refer to the device in which liquid nitrogen is used to remove heat from (or cool) another substance having a temperature higher than that of the liquid nitrogen (such as the engine coolant 21). The liquid nitrogen heat exchanger 110 preferably includes a housing 170 having a first cover 171 and a second cover 172. The first and second covers 171 and 172, respectively, are preferably made of a metallic material, such as steel, and are connected to the housing 170 using any known or appropriate fastener, connector or other material or substance, such as a bolts 173.

The liquid nitrogen heat exchanger 110 further preferably includes a liquid nitrogen distribution manifold 174 having inlet 112 for receiving liquid nitrogen 106 and outlet 114 for conveying vaporized liquid nitrogen 106 to the radiator 135 as described above. The liquid nitrogen distribution manifold 174 also preferably includes a main branch 176 having extending therefrom and communicating therewith a multitude of runners 177 wherein each runner 177 has a multitude of holes 178 therein. The holes 178 in the runners 177 allow liquid nitrogen 106 to be sprayed upon first and second engine coolant heat exchangers 180 and 181. Each runner 177 is preferably tubular shaped and most preferably has a round cross-section but may have any known or appropriate shape and cross-section which will allow the liquid nitrogen 106 to flow there through and be sprayed from holes 178.

Each engine coolant heat exchanger 180 and 181 is any standard or well known fin-tube type heat exchanger for having a fluid (engine coolant 21) flowing there through. Each engine coolant heat exchanger 180 and 181 includes inlets 195 and outlets 116 for connection with the engine coolant circuit as described above. The first and second engine coolant heat exchangers 180 and 181 are preferably located on each side of the liquid nitrogen distribution manifold 174 so as to sandwich the liquid nitrogen distribution manifold 174 there between as best shown in FIG. 7. Thus, liquid nitrogen 106 that is sprayed from holes 178 located on both sides of the runners 177 of the liquid nitrogen distribution manifold 174 is sprayed upon fins 183 located on the first and second engine coolant heat exchangers 180 and 181.

In operation the liquid nitrogen heat exchanger 110 serves to remove heat from the engine coolant 21 by heating the relatively very cold liquid nitrogen 106 causing it to change from liquid nitrogen to vapor or gaseous nitrogen. First, relatively warm engine coolant 21 from one of the storage tank 125 and the heat exchanger 128 enters the liquid nitrogen heat exchanger 110 and its first and second engine coolant heat exchangers 180 and 181 via inlet 195 and transfers heat to the first and second engine coolant heat exchangers 180 and 181 and its fins 183. At the same time that engine coolant 21 is flowing through the first and second engine coolant heat exchangers 180 and 181, liquid nitrogen flows through the liquid nitrogen heat exchanger 110 and its liquid nitrogen distribution manifold 174 via inlet 112 and is distributed via branch 175 to runners 177 where the liquid nitrogen 106 is dispersed via holes 178. The holes 178 are preferably located on both sides of the runner 177 and preferably a round hole made substantially perpendicular to the surface of the runner 177. It should be understood that the holes 178 may be any known or appropriate passage or other structure which will communicate the liquid nitrogen 106 from within the runner 177 and allow it to be dispersed or sprayed on the first and second engine coolant heat exchangers 180 and 181.

As the liquid nitrogen 106 is sprayed onto the fins 183 of the first and second engine coolant heat exchangers 180 and 181, it is heated above its boiling point and it is turned from a liquid into a gas. The liquid nitrogen 106 extracts heat from the first and second engine coolant heat exchangers 180 and 181 and lowers the temperature of the engine coolant 21. Once the engine coolant 21 flows through the first and second engine coolant heat exchangers 180 and 181, it exits via outlet 116 of the first engine coolant heat exchanger 180 and the outlet 116 of the second engine coolant heat exchanger 181 and is communicated to the engine 118 where it draws heat there from to cool the engine 118 in conjunction with the head gasket test specification.

It should be understood that the inlets 195 and outlets 116 may be arranged in any appropriate arrangement such that there is only a single inlet 195 and single outlet 116 using any connector, distributor or manifold or may be made to function separately. Thus, it should be understood that while there is only a single inlet 195 and single outlet 116 shown schematically for the liquid nitrogen heat exchanger in FIGS. 2 and 3, this is because the testing system 99 is graphically simplified therein whereas the liquid nitrogen heat exchanger 110 is shown in greater detail in FIGS. 6 through 8. The similar graphic simplification of the drawings should be understood for the inlets 112 and outlets 114 of the liquid nitrogen distribution manifold 174 of the liquid nitrogen heat exchanger 110 as shown in FIGS. 2 and 3 as compared to FIGS. 6 through 8.

It should be understood that the amount of liquid nitrogen 106 supplied to the distribution manifold 174 is balanced depending upon the amount of heat to be taken out of the engine coolant 21. Further, when the test apparatus 99 is idle, it is necessary to stop the flow of liquid nitrogen 106 to prevent freezing of engine coolant 21 in the first and second engine coolant heat exchangers 180 and 181. However, latent heat in the first and second engine coolant heat exchangers 180 and 181 can cause the temperature of the liquid distribution manifold 174 to rise above the freezing temperature of the liquid nitrogen 106 which could result in rapid expansion of the liquid nitrogen 106 therein. To avoid this situation, the liquid nitrogen heat exchanger is placed in a bypass mode for ensuring that the liquid nitrogen 106 remains in its liquid state. In the bypass mode, liquid nitrogen from the tank 100 is slowly fed into the liquid nitrogen heat exchanger 110, and allowed to flow through the distribution manifold 174 of the liquid nitrogen heat exchanger 110 to prevent the liquid nitrogen 106 in the liquid nitrogen heat exchanger 110 from vaporizing and expanding within the runners 177. To prevent such vaporization of the liquid nitrogen in the liquid nitrogen heat exchanger 110, a small amount of cryogenically cooled liquid nitrogen 106 continuously passes through the a bypass loop 150 and does not transfer heat to the engine coolant 21 in the first and second engine coolant heat exchangers 180 and 181 of the liquid nitrogen heat exchanger 110.

The continuous supply of cryogenically cooled liquid nitrogen 106 to the feedback loop 150 prevents the liquid nitrogen 106 in the liquid nitrogen heat exchanger 110 and distribution manifolds therein from vaporizing. It should be noted that despite the use of the bypass loop 150 to prevent the liquid nitrogen 106 from boiling, due to surface vaporization, a small amount of gaseous nitrogen is produced from the liquid nitrogen heat exchanger 110.

It should be appreciated, that the testing apparatus 99 and cooling system 101 employ numerous valves, such as valves 108A, 108B, 126, 136, 138, 140, 193, each of which may be any one of a check valve, ball-in-socket, a solenoid valve, etc. Although any known or appropriate type of valve may be employed, it is preferable that the valve have an appropriate operating range of at least −40° F. to 300° F. In particular, it is also preferably that valves 108A and 108B be rated for cryogenic service. In addition, each of the valves 108A, 108B, 126, 136, 138, 140, 193 must be capable of being opened and closed at precise instances during the process. To accomplish the systematic opening and closing of the valves 108A, 108B, 126, 136, 138, 140, 193 the testing apparatus 99 includes the controller 200, shown schematically in FIG. 3. The controller 200 may be any type of computing or electronic device capable of functioning as shown. The controller 200 is preferably a personal computer using standard process control software and appropriate input and output hardware to process signals from various sensors or transducers in the system and to control the solenoid valves and pumps described herein.

During the second test portion (or chill down) portion of the head gasket test cycle, the controller 200 receives a signal from the temperature measuring device 202 corresponding to the temperature of the engine coolant 21 leaving the engine 118. If the temperature of the coolant is above the predetermined temperature limit $T_{L1}$, which is preferably set somewhere between about 110° F.–120° F., the controller 200 will: (a) adjust the sixth valve 193 to direct brine into the liquid heat exchanger 128; (b) adjust the second valve 126 to direct the engine coolant 21 into the liquid heat exchanger 128; (c) adjust the third valve 136 to direct engine coolant 21 exiting the liquid heat exchanger 128 to flow toward the fourth valve 138; and (d) adjust the fourth valve 138 to direct engine coolant 21 coming from the third valve 136 to flow toward the first valve 140, and direct the flow of engine coolant 21 into the engine inlet 120.

By way of contrast, if the temperature of the engine coolant 21, as measured by the temperature measuring device 202, is less than the predetermined temperature limit $T_{L1}$, the controller 200 will: (a) adjust the sixth valve 193 to direct brine to flow directly to the air cooled liquid heat exchanger 135; (b) adjust the second valve 126 to direct the engine coolant 21 to flow toward the fourth valve 138; (c) adjust the fourth valve 138 to direct engine coolant 21 to flow toward the third valve 136; (d) adjust the third valve 136 to direct engine coolant 21 coming from the fourth valve 138 into the liquid nitrogen heat exchanger 110; and (e) adjust the fifth valve 140 to direct the flow of engine coolant 21 exiting the liquid nitrogen heat exchanger 110 into engine 118 through inlet 120. Finally, if the temperature of the engine coolant 21, as measured by the measuring device 202, is below approximately the predetermined temperature limit $T_{L2}$ which is preferably selected to be about −16° F., the controller 200 will close the high-flow valve 108A and open the low-flow valve 108B to reduce the flow rate of liquid nitrogen in the liquid nitrogen heat exchanger 110 and the controller 200 will maintain the temperature of the engine coolant 21 exiting from the engine 118 in the range of approximately the −20° F. to −40°F. for the duration of the second test portion until the head gasket test cycle is started over.

It should be appreciated, at this point, that either third valve 136 or fourth valve 138 could be eliminated. For example, if the third valve 136 is eliminated, engine coolant 21 leaving the liquid heat exchanger 128 is communicated directly to the fourth valve 138 from which it is communicated directly to the first valve 140. However, when the engine coolant 21 temperature is below $T_{L1}$, the second valve 126 directs the engine coolant 21 to the fourth valve 138. In this embodiment additional piping would be needed to direct the engine coolant 21 from the fourth valve 138 to the intake 142 of the liquid nitrogen heat exchanger 110. It should be readily appreciated that eliminating the fourth valve 138 would yield the same additional piping requirements.

Similarly, both the third valve 136 and the fourth valve 138 could be eliminated. For example, if both valves 136 and 138 are eliminated, engine coolant 21 leaving the liquid heat exchanger 128 will be directed directly to the first valve 140. Similarly, if the engine coolant 21 temperature is below $T_{L1}$, the engine coolant 21 will be pumped directly from the second valve 126 to the inlet 142 of the liquid nitrogen heat exchanger 110. Similarly, this alternate embodiment requires additional piping as compared to the arrangement shown in FIG. 2. Accordingly, although the preferred design as shown in FIG. 2 uses more valves to accomplish the engine head gasket test, the preferred design eliminates extra piping.

It should also be readily apparent that reducing the temperature of the engine coolant 21 is also affected at least to some degree by the ambient temperature in which the testing apparatus 99 is housed. However, these effects and the associated system gains and losses are considered negligible and do not adversely affect the overall system performance.

The advantages of the testing apparatus 99 and cooling system 101 are plentiful, First, unlike the prior art system which uses refrigerants (such as Freon or its equivalents, some of which present a danger to the environment), the only byproduct of the cooling system 101 is the gaseous nitrogen from the liquid nitrogen heat exchanger 110. Further, as the brine is cooled by the gaseous nitrogen flowing into the air-cooled radiator 135, the brine is conserved and then reused in the heat exchanger 128 in subsequent cycles via the brine supply tank 190.

Second, the cooling system 101 uses far less engine coolant 21 than the known prior art and in one preferred embodiment can use less than about ten gallons of engine coolant 21. Accordingly, the testing apparatus 99 in one configuration uses less than one percent (1%) of the engine coolant 21 required in the conventional system of FIG. 1. There is a significant cost savings since less engine coolant 21 is wasted when, for example, a head gasket fails (an object of the head gasket testing), and the engine coolant 21 is contaminated by engine oil and must be replaced. Since in one embodiment of the present invention, the recovery tank of the conventional system of FIG. 1 can be eliminated, the overall capital set-up cost of the testing apparatus 99 and its cooling system 101 are far less than the set-up costs of conventional systems. As a result, the test apparatus 99 and cooling system 101 as shown for example in FIG. 2 yields outstanding overall cost savings for both one-time set-up costs and ongoing cycle costs as compared to known testing apparatus such as shown in FIG. 1.

Third, other than the liquid nitrogen storage tank 100 which may preferably be stored outside the testing facility, the overall space requirement of the testing apparatus 99 and cooling system 101 are much smaller than the space requirement of the conventional system. As the head gasket test apparatus 99 of FIG. 2 lacks a large coolant supply tank and a large recovery tank, the head gasket test apparatus 99 can be manufactured to fit in a space of about 2.5'×6'×5' and to weigh less than about 500 lbs. Moreover, the compact head gasket test apparatus 99 is alternatively, easily made portable by incorporating casters (or other movement enhancing devices) under the system.

Fourth, unlike the conventional system which uses three pumps to force the engine coolant 21, the head gasket test apparatus 99 according to the present invention as shown in one embodiment in FIG. 2 only uses one high-rate positive displacement pump 124. In one alternative embodiment, the head gasket test apparatus 99 uses a second pump to circulate the brine from the storage tank 190 through the heat exchanger 128 and the air cooled radiator 135. As a result, although the control system 200 of the head gasket test apparatus 99 (which must control seven valves rather than two) is slightly more complex, overall the head gasket test apparatus 99 and the cooling system 101 are mechanically simpler to maintain and easier to operate.

Fifth, the positive displacement pump 124 maintains an engine coolant 21 flow rate at the constant rate R1. Thus, as the viscosity of the engine coolant 21 increases as its temperature lowers it increases the friction in the heat exchanger tubes in the liquid nitrogen heat exchanger 110. This increase in friction beneficially serves to prevent ice from accumulating in the tubes of the liquid nitrogen heat exchanger 110 thereby helping to prevent freezing of the cooling system 101.

Sixth, the cooling power of the liquid nitrogen 106, as applied to engine coolant 21, is still great despite the relatively high flow rate R1 of the engine coolant 21. More specifically, the heat removal from the engine coolant 21 is limited only by the flow rate R1 of the liquid nitrogen 106 and the size of the liquid nitrogen heat exchanger. As one gallon of liquid nitrogen absorbs approximately 1,000 BTU's of heat as it transition from its liquid state to gaseous state when the liquid nitrogen flows at a rate of about six to eight gallons per minute (through high-flow valve 108A) for seven minutes, the system yields 6,000–8,000 BTUs per minute or about 42,000–56,000 BTU total cooling power. Further, when the liquid nitrogen flows at a rate of about one to two gallons per minute (through the low-flow valve 108B) for five minutes, the system yields 1,000–2,000 BTU per minute or about 5,000–10,000 BTU of total cooling power.

Figure 4:
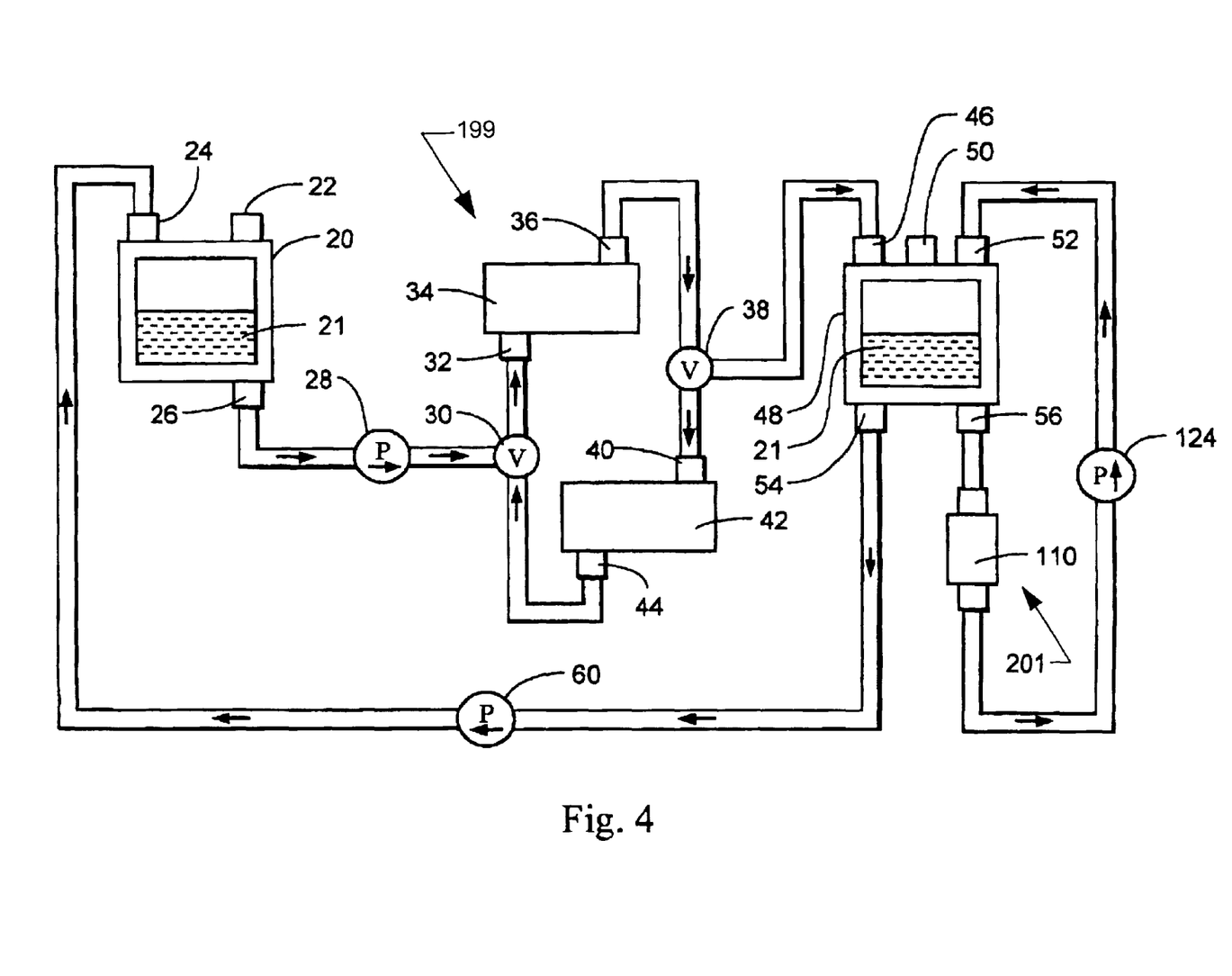
FIG. 4 is a schematic diagram of a testing apparatus according to the present invention used to cool engine coolant to be used in the cyclic testing of a head gasket on an engine.

An alternative variation of the head gasket testing apparatus 99 of FIGS. 2 and 3 is shown in FIG. 4 as the testing apparatus 199 and cooling system 201. The cooling system 201 involves simply replacing the traditional mechanical refrigeration equipment 66, as disclosed in FIG. 1, with the liquid nitrogen heat exchanger 110 and adding the positive displacement pump 124. In the testing apparatus 199 as shown in FIG. 4, the task of rapidly chilling the engine coolant 21 as required for the head gasket torture test may be accomplished without the expense, size, electrical infrastructure, high maintenance and inherent environmental risks of the traditional mechanical refrigeration system 66. Further, the alternative embodiment of FIG. 4 has the benefit of using, with some modifications, the existing testing equipment and cooling system of known conventional systems such as shown in FIG. 1. It should be understood that the cooling system 201 of the embodiment shown in FIG. 4 is operated using the teachings of the cooling system 101 of FIGS. 2 and 3 and eliminating the additional valves, piping, and equipment. In FIG. 4, the cold storage tank 20 for the engine coolant 21 remains to provide a reservoir of super chilled engine coolant 21 separate from the recovery tank 48.

Figure 5:
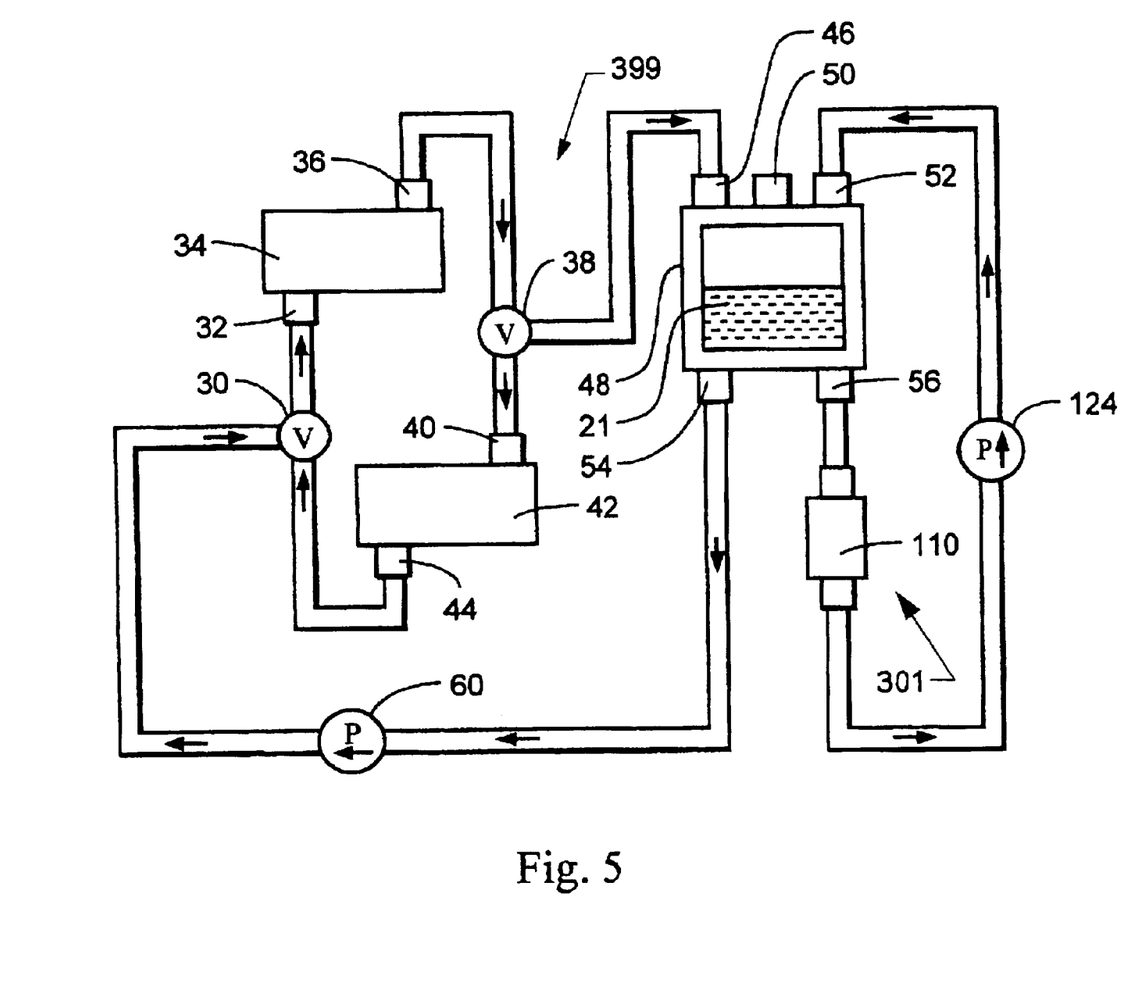
FIG. 5 is a schematic diagram of an alternate embodiment of the testing apparatus similar to FIG. 4 but without a cold storage tank.

A further variation of head gasket testing apparatus 99 of the present invention is shown in FIG. 5 as testing apparatus 399. In the testing apparatus 399 the cooling system 301 involves the alternative embodiment as shown in FIG. 4 but eliminates the separate cold storage tank 20, pump 28 and related piping. In the variation of FIG. 5, the outlet of pump 60 is directly connected to valve 30. During the first or hot portion of the test, the positive displacement high volume pump 124 in conjunction with the liquid nitrogen heat exchanger 110 rapidly reduces the temperature of the engine coolant 21 by circulating the engine coolant 21 multiple times within the time period for the test to rapidly cool the engine coolant 21. When cold engine coolant 21 is required for the chill down portion of the test, valve 30 is opened and pump 60 pumps chilled engine coolant 21 at a rate of about 5 to 25 gallons per minute through the engine 34 and back to the recovery tank 48 via valve 38. Due to the constant, powerful cooling of the liquid nitrogen heat exchanger 110 and high flow rate of engine coolant 21 by the positive displacement pump 124, the engine coolant 21 entering recovery tank 48 from the engine 34 remains at a temperature below the preferable $T_{L2}$ temperature limit (somewhere in the range of −40° F. to −16° F. within the required time limits of the cylinder head gasket test specification) despite the heat drawn off from the engine 34.

By way of additional example, the liquid nitrogen 106 used to cool the engine coolant 21 may be replaced by another cryogenic cooling agent such as, for example, liquid carbon dioxide, liquid oxygen, liquid argon (or other noble gas), liquid hydrogen, etc. However, liquid nitrogen is most preferable because it is relatively inexpensive in comparison to the other possible cryogenic cooling agents; is relatively easy to transport and handle; is readily available; and yields only gaseous nitrogen as a byproduct. By way of contrast, liquid oxygen presents handling concerns (due to its volatile nature) and also may yield ice in addition to gaseous oxygen; ice can clog the system creating a testing failure. Liquid hydrogen presents similar concerns as liquid oxygen. Although liquid noble gases (such as, for example, argon and radon) do not present handling concerns and will not produce ice, they are expensive and can be harmful to the environment. Similarly, liquid carbon dioxide would yield gaseous carbon dioxide (which is known to be harmful to the environment) which would need to be subjected to a chemical reaction to convert it into environmentally safe compound.

Although the aforementioned description relates to a preferred embodiment of the invention, the invention is not intended to be so restricted. It will be apparent to those skilled in the art that various modifications and variations can be made to the disclosed preferred embodiment and alternatives without departing from the scope or spirit of the present invention. For example, any number of additional elements may be added to the testing apparatus 99 to increase its performance. Accordingly, it should be understood that the testing apparatus and method described herein are illustrative only and are not limiting upon the scope of the invention indicated by the following claims. Some simplifications in the drawings and specification are made for ease of description and should be interpreted accordingly. For example, in the testing apparatuses 199 and 399 shown in FIGS. 4 and 5, the liquid nitrogen heat exchanger 110 is very simply graphically shown such that all of its related structure and components are not detailed therein but it is understood that disclosure and teachings of the other Figures and the specification are applied to achieve the desired result. Further, alternatives which would be obvious to one of ordinary skill in the art upon reading the teachings herein disclosed, are intended to be within the scope of the invention set forth in the appended claims.

What is claimed is:

1. A testing apparatus for use in rapidly cooling an engine coolant for use in a liquid cooled engine, the testing apparatus comprising:
   a liquid nitrogen heat exchanger;
   a pump in fluid communication with an outlet of the engine;
   a valve in fluid communication with an outlet of the pump;
   wherein the valve is adapted to direct engine coolant flowing from the pump to flow in a first direction if the temperature of the engine coolant is above a predetermined value, and wherein the valve is adapted to direct the engine coolant to flow in a second direction if the temperature of the coolant is below the predetermined valve, wherein when the engine coolant is directed to flow in the second direction, the engine coolant is directed into the liquid nitrogen heat exchanger; and
   a liquid heat exchanger having an inlet adapted to receive engine coolant directed to flow in the first direction by the valve, and an outlet in fluid communication with the engine.

2. The apparatus according to claim 1 wherein the pump is a positive displacement pump.

3. The apparatus according to claim 1 wherein a positive displacement pump forces the engine coolant to move at a flow rate ($R_1$) selected from the range of about sixty to about eighty gallons per minute.

4. The apparatus according to claim 1 wherein the temperature of the engine coolant is measured at the outlet of the engine.

5. The apparatus according to claim 1 wherein the predetermined engine coolant temperature is selected from the range of about 110° F. to about 120° F.

6. The apparatus according to claim 1, wherein the testing apparatus is located in a testing facility, the apparatus further comprising a liquid nitrogen storage tank in fluid communication with the liquid nitrogen heat exchanger, the liquid nitrogen storage tank being located outside of the testing facility.

7. The apparatus according to claim 2, wherein the engine coolant contained in the engine and the testing apparatus has a volume of less than about ten gallons.

8. The apparatus according to claim 2, wherein the engine coolant has a volume of less than about five gallons.

9. The apparatus according to claim 1, further comprising:
   a supply tank containing liquid nitrogen;
   an intake line in fluid communication with the supply tank and with the liquid nitrogen heat exchanger; and
   wherein the intake line is adapted to carry liquid nitrogen from the supply tank to the liquid nitrogen heat exchanger.

10. The apparatus according to claim 9, further comprising a bypass loop having a first end in communication with the supply tank and a second end in communication with the liquid nitrogen heat exchanger, the bypass loop being adapted to prevent liquid nitrogen within the liquid nitrogen heat exchanger from boiling and not for drawing heat from the engine coolant passing through the liquid nitrogen heat exchanger.

11. A method of testing a cylinder head gasket for an engine, the method comprising the steps of:
   running the engine to raise the temperature of an engine coolant during a first test period;
   pumping the engine coolant through the engine using a positive displacement pump;
   measuring the temperature of the engine coolant to determine whether the temperature is above a predetermined temperature;
   if the temperature of the coolant is above the predetermined temperature, pre-cooling the engine coolant to have a temperature below the predetermined temperature;
   if the temperature of the engine coolant is below the predetermine temperature, cooling the engine coolant by pumping the engine coolant into a liquid nitrogen heat exchanger to further lower the temperature of the coolant below a second predetermined temperature.

12. The method of claim 11, wherein the step of pre-cooling the engine coolant to have a temperature below the predetermined temperature comprises the step of pumping the engine coolant through a liquid heat exchanger having a relatively cool brine solution flowing through the liquid heat exchanger.

13. The method of claim 11, wherein the step running the engine includes running the engine at a wide open throttle position for a predetermined period of time.

14. A method of reducing a temperature of an engine coolant for use in conducting a head gasket torture test, comprising the steps of:
   pumping the engine coolant through the engine using a positive displacement pump;
   measuring the temperature of the engine coolant exiting the engine to determine whether the temperature is above a first predetermined temperature;
   if the temperature of the engine coolant is above the first predetermined temperature, pumping the engine coolant through a liquid heat exchanger having a relatively cool brine solution circulating therein;
   if the temperature of the engine coolant is below the first predetermined temperature, pumping the engine coolant into a liquid nitrogen heat exchanger having liquid nitrogen flowing through the liquid nitrogen heat exchanger until the temperature of the engine coolant is below a second predetermined temperature.

15. The method according to claim 14, wherein the pump is a positive displacement pump.

16. The method according to claim 15, wherein the positive displacement pump forces the engine coolant to move at a rate greater than about sixty gallons per minute.

17. The method according to claim 14, wherein the first predetermined temperature is selected from the temperature range of about 110° F. to about 120° F.

18. The method according to claim 14, further comprising the steps of locating the liquid nitrogen heat exchanger, the engine, the liquid heat exchanger within a testing facility; and locating a supply tank for supplying liquid nitrogen to the liquid nitrogen heat exchanger outside of the testing facility.

19. The method according to claim 18, further comprising the step of supplying an additional amount of liquid nitrogen to a bypass loop in the liquid nitrogen heat exchanger.

20. The method according to claim 18, wherein the step of supplying liquid nitrogen to the liquid nitrogen heat exchanger further comprises the step of supplying liquid nitrogen at a predetermined flow rate, wherein the predetermined flow rate is selected from a range of about six to about eight gallons per minute.

21. The method according to claim 18, further comprising the steps of:
   converting the liquid nitrogen in the liquid nitrogen heat exchanger into gaseous nitrogen; and
   venting the gaseous nitrogen into the liquid heat exchanger to cool the brine solution.

22. The method according to claim 14, further comprising the step of stopping the engine prior to the step of pre-cooling the engine coolant.

23. The method according to claim 14, further comprising the step of filling the test apparatus with less than about ten gallons of engine coolant.

24. The method according to claim 14, further comprising the step of reducing the flow rate of the liquid nitrogen flowing through the liquid nitrogen heat exchanger and maintaining the temperature of the engine coolant below the second predetermined temperature.

25. The method according to claim 24, wherein the second predetermined temperature is selected from the temperature range of about −40° F. to about −16° F.

26. A test apparatus for use in cooling an engine coolant for testing a head gasket of an engine, the testing apparatus comprising:
   a pump in fluid communication with an outlet of the engine for receiving the engine coolant from the engine and pumping the engine coolant through the test apparatus;
   a liquid nitrogen heat exchanger including a liquid nitrogen distribution manifold having an inlet for receiving a supply of liquid nitrogen, and the liquid nitrogen heat exchanger including an engine coolant heat exchanger having an inlet for receiving engine coolant from the pump and having a first side for receiving liquid nitrogen distributed thereon to provide a cooling effect on the engine coolant passing through the engine coolant heat exchanger.

27. The test apparatus according to claim 26 wherein the pump is a positive displacement pump.

28. The test apparatus according to claim 27 wherein the positive displacement pump forces the engine coolant to flow at a rate ($R_1$) selected from the range of about sixty to about eighty gallons per minute.

29. The test apparatus according to claim 26 further comprising a temperature gauge for measuring the temperature of the engine coolant at the outlet of the engine.

30. The test apparatus according to claim 26 wherein the liquid nitrogen distribution manifold comprises:
   a main branch in fluid communication with the inlet to the liquid nitrogen distribution manifold;
   a runner having a first end connected to the main branch, a second end extending in a direction away form the main branch and a passage located on the runner and aligned with the engine coolant heat exchanger to cause liquid nitrogen communicated through the passage to be directed at the engine coolant heat exchanger.

31. The test apparatus according to claim 30 wherein the runner is a tube.

32. The test apparatus according to claim 31 wherein the runner is a tube having a circular cross section.

33. The test apparatus according to claim 31 wherein the passage in the runner is a hole aligned substantially perpendicular with a surface of the runner.

34. The test apparatus according to claim 26, further comprising a liquid nitrogen storage tank in fluid communication with the liquid nitrogen heat exchanger, the liquid nitrogen storage tank continuously supplying liquid nitrogen to the liquid nitrogen distribution manifold to prevent liquid nitrogen from boiling while in the liquid nitrogen distribution manifold.

35. The test apparatus according to claim 26, wherein the liquid nitrogen heat exchanger further includes a second engine coolant heat exchanger having an inlet for receiving engine coolant from the pump and an outlet for communicating engine coolant to the engine, wherein the liquid nitrogen distribution manifold is located between the engine coolant heat exchanger and the second engine coolant heat exchanger; and wherein the liquid nitrogen distribution manifold is adapted to distribute liquid nitrogen on the engine coolant heat exchanger and the second engine coolant heat exchanger at the same time to cool engine coolant flowing through the engine coolant heat exchanger and the second engine coolant heat exchanger before the coolant is communicated back to the engine.

36. The test apparatus according to claim 35, further comprising a liquid nitrogen storage tank in fluid communication with the liquid nitrogen heat exchanger, the liquid nitrogen storage tank continuously supplying liquid nitrogen to the liquid nitrogen distribution manifold to prevent liquid nitrogen from boiling while in the liquid nitrogen distribution manifold.

\* \* \* \* \*